(12) United States Patent
Striuli

(10) Patent No.: US 7,212,836 B2
(45) Date of Patent: May 1, 2007

(54) FIXED ACCESS NETWORK FOR MOBILE TELECOMMUNICATIONS SERVICES AND APPARATUS

(75) Inventor: Alessandro Striuli, Venezia Mestre (IT)

(73) Assignee: ITEC S. r. l., Turin (IT)

( * ) Notice: Subject to any disclaimer, the term of this patent is extended or adjusted under 35 U.S.C. 154(b) by 0 days.

(21) Appl. No.: 10/511,850

(22) PCT Filed: Apr. 2, 2003

(86) PCT No.: PCT/IB03/01195

§ 371 (c)(1),
(2), (4) Date: Oct. 1, 2004

(87) PCT Pub. No.: WO03/084264

PCT Pub. Date: Oct. 9, 2003

(65) Prior Publication Data

US 2005/0170860 A1    Aug. 4, 2005

(30) Foreign Application Priority Data

Apr. 3, 2002 (IT) .......................... VE2002A0013

(51) Int. Cl.
*H04M 1/00* (2006.01)
(52) U.S. Cl. .................................. 455/552.1
(58) Field of Classification Search ............. 455/552.1, 455/550.1
See application file for complete search history.

(56) References Cited

U.S. PATENT DOCUMENTS 6,167,271 A    12/2000  Parker et al.
2001/0046839 A1   11/2001  Latva-Aho

FOREIGN PATENT DOCUMENTS

| EP | 0 758 189 A | 2/1997 |
| EP | 0 766 427 A | 4/1997 |
| WO | WO 99 63783 | 12/1999 |
| WO | WO 00 70895 A | 11/2000 |

*Primary Examiner*—William D. Cumming
(74) *Attorney, Agent, or Firm*—Levine & Mandelbaum

(57) ABSTRACT

A telecommunications network for mobile users of the third generation has a user subsystem and a transport subsystem, associated with an access subsystem, which has a general user-access communication interface and a transport-access communication interface facing them, respectively, able to ensure information flow between the subsystems. The user subsystems can connect to the access subsystem through telecommunications cables.

6 Claims, 1 Drawing Sheet

FIXED ACCESS NETWORK FOR MOBILE TELECOMMUNICATIONS SERVICES AND APPARATUS

BACKGROUND OF THE INVENTION

The present invention relates to a telecommunications network for mobile users, said telecommunications network for mobile users (UNET) comprising a user subsystem (STU) and a transport subsystem (STT) associated by means of an access subsystem (STA), which has a user-access communication interface (Uu) and a transport-access communication interface (Iu) respectively facing the subsystem (STU) and the transport subsystem (STT), being apt to ensure exchange of information flows (TS) between said subsystems.

Based on many tests, a strong increment of the quantity of information exchanged between the users provided with terminals for mobile radiocommunications and the networks of the providers of such services is predicted within a short term.

In view of this future requirement, several national and international organizations operating for the ruling of the radio frequencies and relevant standards for signal treatment, modulation and multiplexing (ITU, ETSI, FCC, etc.), have agreed on the definition of a standard (or families of standards, such as IMT2000) in order to ensure a significant increase of the data exchange rate between the network and the mobile telephone terminal and vice-versa. The family IMT2000 includes, e.g,. the new standards called CDMA2000 and UMTS (Universal Mobile Telecommunications System) or 3G (third generation), which will ensure performance of video-conferences and compatibility with the protocols of Internet networks (such as Ipv6) with other networks of the same family, such as DECT and with the wireless telephone networks of previous standards (2G), such as GSM and PCS and relative improvements, such as GPRS, EDGE, etc. (usually indicated with 2.5G).

Therefore, there is reason to believe that diffusion of new terminals in a position to ensure efficient connection to Internet, visualize video-films and reproduce data, voice, musicals and television files downloadable from Internet, will entail a significant increase of the amounts of data in transition in the terrestrial radio networks for the mobile telephony of the next generation.

By way of example, according to UMTS standard the mobile systems of the third generation are designed for multi-medial communications. With these systems, communications from individual to individual can be improved with quality images and/or video and access to information or services on private and public networks can benefit of the highest data rate available and of the higher communication flexibility of such systems.

Moreover, these systems have the following features:
variable Bit Rate for providing a band width compatible with the required service (ranging from 16 kbps for vocal communication to 2 Mbps for "High Multimedia" services);
multiplexing services with different quality requirements in one single connection;
delay requirements for traffic in real time;
quality requirements ranging from 10% frame error to $10^{-6}$ bit error rate;
co-existence with second generation systems (e.g. GSM) and inter-systems handover for better traffic coverage and balancing;
asymmetric traffic support for uplink (from user to provider) and downlink (from provider to user);

As a result, the most important features of the network according to UMTS standard are a high bit-rate for the user, compatibility with Internet standards, managing capacity of multi-medial files and connecting capacity of the terminal in "always on" mode.

It is also logically predictable that upon starting the use of UMTS networks the traffic will mainly consist of voice and Internet contents, whereas the portion of multi-medial data traffic is going to increase later.

Since requested information will often be available on the Internet network, it is important to develop an efficient TCP/UDP/IP traffic management in the UMTS network.

Therefore, in order to be successful, UMTS network will have to execute a wide range of applications with different performance requirements and service quality.

Consequently, the terminals apt to perform this wide range of services will also incorporate typical features and functions of portable personal computers. As a result, it is predictable that in the future the telecommunications performances required for connection to the networks for mobile services of the third generation will also be integrated in portable personal computers.

In particular, personal computers are quite suitable instruments for performing services (or applications) that make use of communications with a higher bit-rate.

In conclusion, wireless network providers will have to undertake continuous investments for their network capacity to equal the increasing demand and ensure an acceptable quality service to clients.

Capacity problems on both the transport and access networks may arise in the event of a high request for new services on mobile networks. In order to increase transport capacity, also the capacity of the various connections will have to be increased; these increases have no theoretical limits, as the limits are only of financial nature. The access capacity, on the contrary, is limited by the frequency band assigned to each provider; the capacity increases may be managed reducing the size of the coverage cells, i.e. increasing their number; however, it is a solution involving technical and bureaucratic problems, and this operation has anyway a limit if pushed to the extreme.

As to its architectural development, UMTS network consists of a set of logical network elements, each one having a specific function. At its standard level, both the logical elements and interfaces open to each other are defined, so that also the physical network elements will be automatically identified.

The presence of open interfaces, in particular in the access network called UTRAN (UMTS Terrestrial Radio Access Network), allows interconnection to the UMTS network also with modes not expressly provided by the present standards.

Concerning the detailed description of the standardized (or in course of definition) services and performances for the mobile telecommunications networks 2.5G and 3G, reference is made to the documentation produced by the groups 3GPP and 3GPP2 ($3^{rd}$ Generation Partnership Project and $3^{rd}$ Generation Partnership Project 2), also available in synthesis from publications, such as "*WCDMA for UMTS*" *Holma and Toskala,* 2000 John Wiley & Sons, whereas the annexed FIG. 1, to be described hereafter, is representing some elements of the UMTS network, which are required for describing the inventive idea.

Therefore, FIG. 1 is representing a block diagram of the highest level architecture of a telecommunications network for mobile users UNET according to UMTS standard, comprising three main subsystems interconnected to each other:

User subsystem STU, indicated in the standard as User Equipment. This user subsystem represents the user terminal system, i.e. a portable terminal, such as a mobile telephone. Said user subsystem STU is interconnected to the telecommunications network for mobile users UNET, in particular to an access subsystem STA, through a user-access interface Uu, through which a data and voice signal TS is received and transmitted. Said user-access interface Uu is a radio interface; as already mentioned above, it is an open type for operating in association to a large number of terminal of different trade-marks. The user subsystem STU comprises a user identification module USIM, similar to the so-called SIM card of GSM standard, and a mobile equipment ME, i.e. the body of the mobile terminal, communicating through a special equipment interface Cu;

Access subsystem STA: this access subsystem STA represents the access network for the UMTS standard, the system UTRAN previously mentioned, and connects to a transport subsystem STT through a transport-access interface Iu;

Transport subsystem STT: this transport subsystem STT, identified as Core Network in the UMTS standard, represents the transport network of the UMTS system. Said transport subsystem STT, besides being interconnected to the access subsystem STA through the transport-access interface Iu, must be able to interconnect to all other existing networks (external networks, PSTN, ISDN, B-ISDN Internet, etc . . . etc.), identified in FIG. 1 by means of a block EXTNET. This transport subsystem STT comprises information switching means, which are peculiar of common mobile telephone systems, i.e. a commutation centre MSC (Mobile services Switching Centre), a database HLR (Home Location Register) and a database VLR (Visitor Location Centre) mainly used for mobility management, an interconnection node (or Gateway) GMSC (Gateway Mobile Switching Centre), a node for managing packet switching SGSN (Serving GPRS Support Node) or GGSN (Gateway GPRS Support Node).

In FIG. 1 some radio base stations SRB can be noticed inside the access subsystem STA, corresponding to the base stations defined as Node-B in the UMTS standard, i.e. the radio stations spread over the territory identifying the cells of the mobile telephony system. Therefore, their main function consists in exchanging the data and voice signal TS with the user subsystems STU through the radio interface Uu. Said radio base stations SRB also manage the main radio resources, such as inner power control. Inside the access subsystem STA a network radio controller CRR is comprised, called Radio Network Controller in the UMST standard. Said network radio controller CRR has complete control of all radio resources of its area, i.e. the radio base stations SRB connected to it through an appropriate controller-stations interface Iub.

The network radio controller CRR controls operation of one or more radio base stations SRB, manages the setting of the radio channels (connections activation and release), frequency-hopping, inner handovers and other functions, communicating with the transport subsystem (STT). A large number of radio base stations SRB existing in a large town area is controlled by a smaller number of network radio controllers (CRR).

Each radio base station (SRB) can manage connection in the network (UNET) through the user-access interface (Uu) of all the user subsystems (STU) located in the surrounding area of the radio base station (SRB); this area, managed by one radio base station alone (SRB), is called a cell. The radio base stations (SRB) are located over the territory in a way to determine a plurality of cells for continuous coverage of the territory itself, minimizing the surfaces where no sufficient radio coverage is available. The purpose is to ensure continuous connection of the moving user subsystems (STU) to the network (UNET).

Due to the predictable increasing requests of multi-medial information, the network UNET described in FIG. 1 will have an increasing traffic from the external networks EXT-NET to be let through the transport/access interfaces Iu and access/user interfaces Uu, in both directions. As said above, in order to ensure acceptable quality service to the clients the providers of UMTS networks and wireless network in general will have to undertake continuous investments for equalling their networks capacity to the increasing demand.

SUMMARY OF THE INVENTION

It is the object of the present invention to provide an additional interconnection mode of a user subsystem (STU) to the transport subsystem (STT), by means of an enhanced access subsystem (STA+), which besides the limited radio transmission resource may also use a cable transmission not subject to expansibility limits.

This enhanced access subsystem (STA+) interfaces the transport subsystem (STT) through an interface Iu in an absolutely identical way as for the access subsystem (STA) according to the prior art.

This enhanced access subsystem (STA+), besides the classic radio base stations (SRB) being apt to manage bidirectional radio communications with the user subsystems (STU), also comprise cabled connections and required devices being apt to associate the user subsystems (STU) to the network radio controllers (CRR).

This set of fixed apparatuses to be added to the access subsystem (STA) for connection between a user subsystem (STU) and a radio network controller (CRR) without taking recourse to the radio resource, will be called "Cable Base Station" (SCB). Said cable base stations (SCB) will be associated to a radio network controller (CRR) through a standard interface Iub, whereas they will be able to associate to the user system (STU) through the most common standards used for interconnecting a personal computer to a LAN (Local Area Network).

The user systems (STU) connected to the network UNET through the cable base stations (SCB) will be treated by the transport subsystem (STT) in the same way as for the usual terminals connected to the net UNET through the usual radio base stations (SRB); their mobility, i.e. their connecting capacity to any cable base station (SCB) can be managed by the usual mobility managing procedures (such as localizing procedures) being used for all terminals connected to the UNET network.

In this frame, it is the main object of the present invention to provide a telecommunications network for mobile users, which can service a larger number of users with the same quantity of radio base stations (SRB) and radio frequencies utilized.

In this context it should be noticed how the most valued resource for an operator of mobile telecommunications services is represented by the frequency band for which licences are owned. The present invention ensures service to a number of users located in particular environments, who do not need to move while using the service, i.e. without consuming such a radio resource.

It should be noticed how a significant set of mobile services of the third generation will be based on applications to be executed on personal computers, how such services can only be adequately enjoyed in appropriate positions (such as sitting and leaning to a board) and how the band request may be so significant as to rapidly exhaust the radio resource available; these services are surely available in a more efficient and effective way by taking recourse to the solution object of the present invention.

A further object of the present invention is to provide a telecommunications network for mobile users, which is compatible with the new standards of cellular telephony, in particular UMTS standard.

In order to achieve such aims, it is the object of the present invention to provide a telecommunications network for mobile users and/or base station and/or network radio controller and/or method for sending information, incorporating the features of the annexed claims and figures, which form an integral part of the description herein.

Further objects, features and advantages of the present invention will become clear from the following detailed description and annexed drawings, which are supplied by way of non limiting example, wherein:

DESCRIPTION OF THE PREFERRED EMBODIMENT

The present invention is based on the principle that a considerable portion of the new multi-medial traffic will be utilized in indoor environments, from terminals integrated to personal computers or quite similar to personal computers, that such services may require a high connection speed, whereas they may not often require a displacement capacity while the service is in use. In such cases it may be convenient to connect these terminals in the network through a fixed connection. Many environments may have a certain number of stations available with a socket for connecting the terminal. It is not excluded that such a socket may be replaced by means of low power wireless technologies (such as bluetooth), in order to reduce the need of patch cables.

A network architecture has been conceived in view of this future development, ensuring a considerable improvement of its capacities in the respect of the new standards and in the most convenient way as possible.

Figure 1:
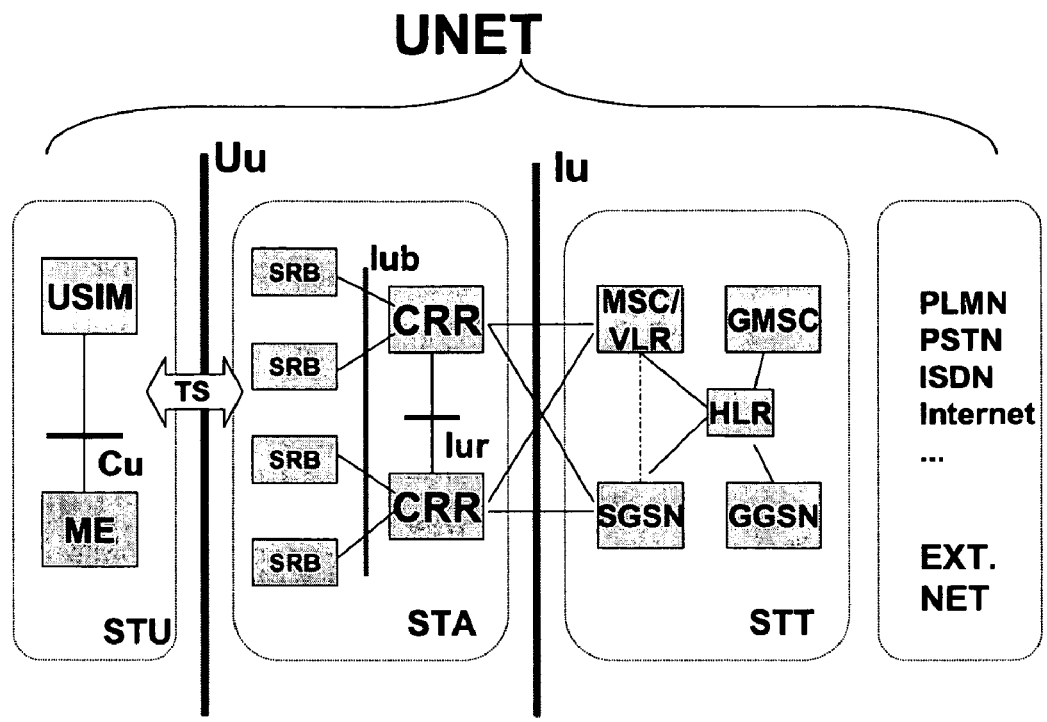
FIG. 1 shows a basic diagram of a mobile telecommunications network (UNET), according to the prior art.
Figure 2:
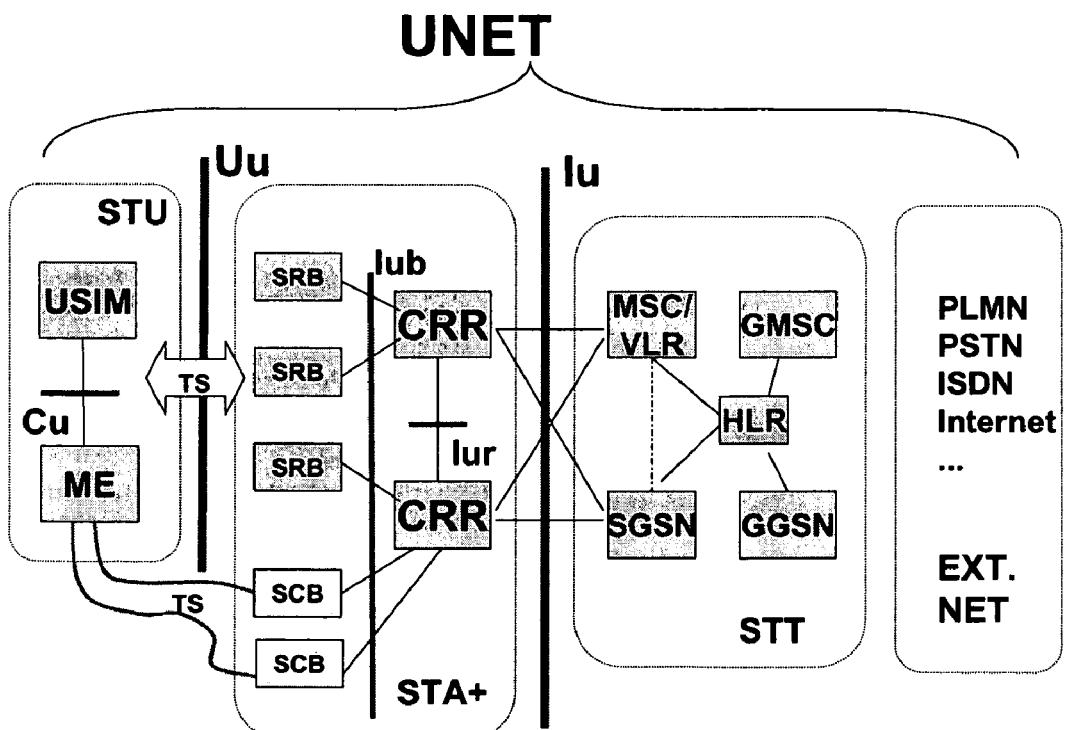
FIG. 2 shows a basic diagram of a telecommunications network for mobile users (UNET) according to the prior art, with the implementations of the present invention.

As a result, the inventive idea consists of an alternative connection of a terminal of a network for mobile users UNET, which besides the usual radio base stations (SRB) is also providing cable base stations (SCB), whose interfaces are represented in the annexed FIG. 2.

Therefore FIG. 2 is representing a diagram of the enhanced access subsystem (STA+), also comprising base stations according to the present invention.

Besides the above advantage of increasing the access capacity of the global system with equal occupied frequencies, and equal sites with radio systems, the present invention still has further advantages.

Other Advantages Are:

Removal of the power control problem,

Possibility of reducing energy consumptions for longer battery life (it would be useful to also equip the stations preset for connection to a cable base station SCB with an electric socket), Elimination of the problems associated to the exposure of the user to electromagnetic radiation.

Moreover, the telecommunications network for mobile users according to the present invention is compatible with UMTS and CDMA2000 standards and with the future systems based on an analogous architecture using open interfaces or through the improvements of previous systems.

It is obvious that many other changes are possible for the person skilled in the art to the telecommunications network for mobile users and/or base station and/or network radio-controller and/or method previously described by way of example, without departing from the novelty principles of the inventive idea, and it is clear that in practical actuation of the invention the components may differ in form from the ones illustrated above in detail, and be replaced with technical equivalent elements.

Finally, it is clear that the telecommunications network according to the present invention is not restricted to the sole architectures according to UMTS standard. For instance, it may also be referred to 2.5G standards.

The telecommunications network according to the present invention can also find application through integration with LAN (Local Area Network) and WLAN (Wireless LAN) networks. The signals according to said protocols can be routed by means of cabled or low mobility pico-cellular access subsystems (available e.g. in supermarkets, airports).

The invention claimed is:

1. A telecommunications network for mobile users, said telecommunications network for mobile users providing wireless communication to wireless mobile users subsystems by means of an access subsystem and a transport subsystem, said access subsystem comprising:
   one or more radio base stations exchanging data signals and voice with said wireless mobile user subsystems through a radio user-access communication interface,
   one or more radio network controller controlling operation of one or more of said radio base stations, said radio network controller connecting said access subsystem to said transport subsystem by means of a transport-access communication interface,
   wherein said access subsystem comprises additional apparatuses for connection between said wireless mobile user subsystems and a radio network controller, and in that said access subsystem also comprises additional cable connections between said additional apparatus and said wireless mobile user subsystems for allowing the communication.

2. A telecommunications network for mobile users, according to claim 1, wherein said additional apparatuses communicate with said radio network controllers through the same interface used by said radio base stations to communicate with said radio network controllers.

3. A telecommunication network for mobile users according to claims 1, wherein additional stations are preset for connection to said additional apparatuses through said cable connections and said additional stations are provided with a socket for connecting the user terminal.

4. A telecommunications network for mobile users, according to claim 1, wherein additional stations are preset for connection to said additional apparatuses through said cable connections and said additional stations are provided with low power wireless technologies.

5. A telecommunications network for mobile users according to claim 3, wherein said additional stations are equipped with an electric socket.

6. A method for increasing capacity for communication with mobile users subsystems in a telecommunications network for mobile users, said telecommunications network for mobile users providing wireless communication to wireless mobile users subsystems by means of an access subsystem and a transport subsystem, said access subsystem having:

one or more radio base stations exchanging data signals and voice with said wireless mobile user subsystems through a radio user-access communication interface, one or more radio network controllers controlling operation of one or more of said radio base stations, each radio network controller connecting said access subsystem to said transport subsystem by means of a transport-access communication interface, wherein said method comprises providing additional base stations for connection between said wireless mobile user subsystems and a radio network controller, and providing cable connections between respective ones of said additional base stations and said wireless mobile user subsystems for allowing the communication.

* * * * *